(12) United States Patent
Shimotsuma et al.

(10) Patent No.: US 8,273,149 B2
(45) Date of Patent: Sep. 25, 2012

(54) METHOD FOR PRODUCING NANOMETER-SIZE WIRES AND NANOMETER-SIZE WIRE

(75) Inventors: Yasuhiko Shimotsuma, Kyoto (JP); Kiyotaka Miura, Kyoto (JP); Kazuyuki Hirao, Kyoto (JP); Mitsuo Kawasaki, Kyoto (JP); Osamu Kajita, Kyoto (JP); Takafumi Iwamoto, Kyoto (JP); Eitaro Yasuda, Kyoto (JP); Shigeyuki Kimura, Kyoto (JP)

(73) Assignee: Kyoto University, Kyoto (JP)

( * ) Notice: Subject to any disclaimer, the term of this patent is extended or adjusted under 35 U.S.C. 154(b) by 795 days.

(21) Appl. No.: 12/308,728

(22) PCT Filed: Jun. 20, 2007

(86) PCT No.: PCT/JP2007/062392
§ 371 (c)(1),
(2), (4) Date: Mar. 19, 2009

(87) PCT Pub. No.: WO2008/001658
PCT Pub. Date: Jan. 3, 2008

(65) Prior Publication Data
US 2009/0291302 A1   Nov. 26, 2009

(30) Foreign Application Priority Data

Jun. 27, 2006   (JP) .................................. 2006-176270

(51) Int. Cl.
*B22F 9/04* (2006.01)
(52) U.S. Cl. .............................. 75/345; 75/354; 977/889
(58) Field of Classification Search .................... None
See application file for complete search history.

(56) References Cited

U.S. PATENT DOCUMENTS

| 7,586,601 | B2* | 9/2009 | Ebstein | 356/301 |
| 2003/0098640 | A1 | 5/2003 | Kishi et al. | |
| 2004/0091638 | A1* | 5/2004 | Haight et al. | 427/582 |
| 2004/0106203 | A1 | 6/2004 | Stasiak et al. | |
| 2006/0268408 | A1* | 11/2006 | Toussaint et al. | 359/487 |

(Continued)

FOREIGN PATENT DOCUMENTS

JP   2002-67000   3/2002

(Continued)

OTHER PUBLICATIONS

Jia, T.Q. et al., "ZnSe nanowires grown on the crystal surface by femtosecond laser ablation in air", Applied Physics Letters, vol. 89, pp. 101116-1 thru 101116-3, published online Sep. 7, 2006.*

(Continued)

*Primary Examiner* — George Wyszomierski
(74) *Attorney, Agent, or Firm* — Hamre, Schumann, Mueller & Larson, P.C.

(57) ABSTRACT

The present invention provides a nanowire production method that is simpler than conventional nanowire production methods, and that makes it easier to control the size and shape of the nanowires by using a technique completely different from the conventional ones. A powder particle containing a metal element is divided into nanometer-size wires containing the metal element by irradiating a suspension of the powder particles with a femtosecond laser. The present invention also makes it possible to divide the nanometer-size wires thus formed into nanometer-size particles containing the metal element by irradiating further the nanometer-size wires with the femtosecond laser.

10 Claims, 15 Drawing Sheets

U.S. PATENT DOCUMENTS

2009/0053523 A1* 2/2009 Kawasaki et al. ............ 428/402

FOREIGN PATENT DOCUMENTS

| JP | 2003-159699 | 6/2003 |
|---|---|---|
| JP | 2004-184414 | 7/2004 |
| JP | 2004184414 A * | 7/2004 |
| JP | 2004-223693 | 8/2004 |
| JP | 2004-263318 | 9/2004 |
| JP | 2004-358583 | 12/2004 |
| JP | 2005-48213 | 2/2005 |
| JP | 2006-75961 | 3/2006 |
| WO | WO 2006/030605 A1 | 3/2006 |

OTHER PUBLICATIONS

Tarasenko, N.V. et al. "Laser-induced modification of metal nanoparticles formed by laser ablation technique in liquids", Applied Surface Science, vol. 247, No. 1-4, 2005, pp. 418-422.

Wang, Zhong Lin et al. "In Situ Structure Evolution from $Cu(OH)_2$ Nanobelts to Copper Nanowires", Journal of Physical Chemistry B, vol. 107, No. 3, 2003, pp. 8275-8280.

Gao. Tao et al. "Electrochemical synthesis of copper nanowires", Journal of Physics, vol. 14, No. 3, 2005, pp. 355-363.

Vorobyev, A. Y. et al. "Effect of surface structural modification on absorptivity of gold in multi-pulse femtosecond laser ablation", Proceedings of the CAOL 2005, vol. 2, pp. 89-92.

Ko, E. et al. "$Cu_2O$ Nanowires in an Alumina Template: Electrochemical Conditions for the Synthesis and Photoluminescence Characteristics", ChemPhysChem, vol. 7, No. 7, 2006, pp. 1505-1509.

Shimotsuma, Y. et al. "Three-Dimensional Nanomodification with Ultrafast Pulse Laser", Proceedings of SPIE, vol. 6985, No. 698503, 2008, pp. 1-12.

Tsuji et al. "Formation of Nana-size Wires by Laser Irradiation of Silver Colloids", Radiation Chemistry, Japanese Society of Radiation Chemistry, No. 75, pp. 31-34, 2004, and full English translation.

Takekeshi Tsuji & Laser Boys ", an Internet site, Takeshi Tsuji and Masaharu Tsuji from Masaharu Tsuji Laboratory, Heterogeneous Integrated Materials, Institute for Materials Chemistry and Engineering, Kyushu University, URL" http://133.5.181.45/TKSTSUJI/.

Shape change of spherical silver nanoparticles produced by underwater laser ablation with laser beam irradiation (1), an Internet site by Takeshi Tsuji and Masaharu Tsuji from Masaharu Tsuji Laboratory, Heterogeneous Integrated Materials, Institute for Materials Chemistry and Engineering, Kyushu University, URL "http://133.5.181.45/TKSTSUJI/researches/photoconv_wire.htm".

* cited by examiner

METHOD FOR PRODUCING NANOMETER-SIZE WIRES AND NANOMETER-SIZE WIRE

TECHNICAL FIELD

The present invention relates to a method for producing nanometer-size wires by an irradiation with a femtosecond laser, and a nanometer-size wire.

BACKGROUND ART

In recent years, nanometer-size wires (hereinafter, also simply referred to as "nanowires") formed of metal, such as gold and silver, have attracted attention as one of the nanoscale materials. The nanowires are expected to show physical and chemical properties (electrical conductivity, thermal conductivity, light emitting property, and catalytic activity, for example) that are not observed in conventional materials, based on their microscopic size and high aspect ratio, etc. Methods for producing the nanowires are disclosed in, for example, JP 2004-263318 A (Document 1), JP 2004-223693 A (Document 2), JP 2002-67000 A (Document 3), "Formation of nanometer-size wire by irradiating silver colloid with a laser beam", Takeshi Tsuji and Masaharu Tsuji, Radiation chemistry, Japanese Society of Radiation Chemistry, year 2003, No. 75, page 31 to 34 (Document 4), "Takeshi Tsuji Raisha Shudan" (Takeshi Tsuji & Laser Boys), an Internet site, Takeshi Tsuji and Masaharu Tsuji from Masaharu Tsuji Laboratory, Heterogeneous Integrated Materials, Institute for Materials Chemistry and Engineering, Kyushu University, URL "http://133.5.181.45/TKSTSUJI/", searched as of Jun. 19, 2006" (Document 5), and "5. Shape change of spherical silver nanoparticles produced by underwater laser ablation with laser beam irradiation (1)", an Internet site by Takeshi Tsuji and Masaharu Tsuji from Masaharu Tsuji Laboratory, Heterogeneous Integrated Materials, Institute for Materials Chemistry and Engineering, Kyushu University, URL "http://133.5.181.45/TKSTSUJI/researches/photoconv_wire.htm", searched as of Jun. 19, 2006" (Document 6).

Document 1 discloses a method for forming a copper nanorod or a copper nanowire by heating metal copper and a molybdenum substrate coated with a carbon thin film at a temperature of 800 to 850° C. in vacuum.

Document 2 discloses a method for forming continuously a metal nanowire by applying a voltage or current from a probe tip to a surface of a precursor prepared for producing the metal nanowire, and drawing the metal nanowire at the probe tip. As the precursor for producing the metal nanowire, Document 2 exemplifies a material formed of an inorganic compound with high ion conductivity, on which ions of at least one metal selected from gold, platinum, silver, copper, and palladium are carried. It describes that such a material can be formed by, for example, bringing a powder of sodium-superionic-conductor-type compound or B-type alumina, into contact with an aqueous solution or a molten salt each containing the ions of the at least one metal. A nanowire of the at least one metal can be formed from the precursor.

Document 3 discloses a method for forming a metal nanowire and/or a metal nanoparticle by irradiating a metal ion carrier (for example, $Ag_{2.3}Na_{0.2}Zr_2Si_{1.5}P_{1.5}O_{12}$. See Production Example 1 of the document) with an electron beam. A silver nanowire can be formed from this carrier.

Document 4 discloses a method in which colloidal silver fine particles with a particle diameter of approximately several nanometers to 100 nm are formed in water by laser ablation, and the colloidal silver fine particles thus formed are irradiated with a nanosecond laser to be fused to each other to form a silver nanowire.

Documents 5 and 6 disclose nanowires formed by irradiating, with an Nd:YAG laser, colloidal silver fine particles (average particle diameter 18 nm) produced by underwater laser ablation as in Document 4. FIGS. 18 and 19 show observation images of the nanowires disclosed in Documents 5 and 6.

In the method of Documents 1, a vacuum and high temperature environment is needed in order to evaporate the metal copper and deposit it on the molybdenum substrate.

The method of Document 2 requires preparation of the precursor for producing the nanowire as a starting material. Also, it is desirable to set the nanowire formation atmosphere to vacuum ($8 \times 10^{-2}$ Pa or lower) and to a high temperature (100 to 500° C.).

The method of Document 3 requires formation of the metal ion carrier as a starting material. Also, since the nanowire is formed while being in contact with the surface of the metal ion carrier, it is necessary to separate the nanowire from the carrier by a mechanical technique, such as centrifugal separation, in order to obtain the nanowire.

In these conventional methods including the methods of Documents 4 to 6, evaporated metal is deposited on a substrate (Documents 1), metal is deposited by reducing metal ions (Documents 2 and 3), or fine particles with nanometer-size particle diameters are fused to each other (Documents 4 to 6) in order to form nanowires. Therefore, in the case of forming a plurality of nanowires, it is difficult to control their size and shape, leading to a large variation among the resultant nanowires.

DISCLOSURE OF INVENTION

The present invention is intended to provide a nanowire production method that is simpler than conventional nanowire production methods, and that makes it easier to control the size and shape of the nanowires by using a technique completely different from the conventional ones.

In the nanowire production method of the present invention, a powder particle containing a metal element is divided into nanowires containing the metal element by irradiating a suspension (including a medium and the powder particles containing the metal element) of the powder particles with a femtosecond laser.

"Nanowire" denotes a substance with a diameter of at least 1 nm but less than 1 μm, and an aspect ratio of at least 5, preferably at least 10, where the aspect ratio is a ratio of a length (a length along the nanowire) to a diameter. The diameter and the length of the nanowire can be obtained by an evaluation of a microscopic appearance, etc. of the nanowire. On the other hand, "nanometer-size particle" that will be described later denotes a substance with a particle diameter of at least 1 nm but less than 1 μm, in which a ratio of a length in a long axis direction to that of a short axis direction is less than 5, typically 2 or less.

The reason is not clear why the irradiation with the femtosecond laser divides the powder particle into nanowires, but the following principle can be considered. When a powder particle containing a metal element is irradiated with a femtosecond laser, waves of surface plasmon will be generated along a surface of the powder particle. The waves of surface plasmon thus generated interfere with the laser that is applied continuously, and thereby periodically-arranged interference patterns are formed on the surface of the powder particle. Conceivably, the formation of the interference patterns causes surface plasmon to be excited on the surface of the powder particle according to the patterns, and this excitation divides the powder particle (see FIG. 1).

Such a division cannot be performed by an irradiation with a picosecond laser, or an irradiation with a nanosecond laser used in Documents 4 to 6. The division only can be realized by an irradiation with a femtosecond laser that exhibits a very short laser-emitting time per pulse and is capable of providing a high energy instantaneously. When the above-mentioned powder particle is irradiated with the nanosecond laser, for example, ablation occurs due to an increased heat contribution to the powder particle, forming directly nanometer-size particles in some cases. However, nanowires cannot be formed even as an intermediate product.

In the nanowire production method of the present invention, a further continuation of the femtosecond laser irradiation even after the nanowires are formed can further divide the formed nanowires into nanometer-size particles (see FIG. 2).

In the method for producing nanometer-size particles (hereinafter, simply referred to as "nanoparticles"), the suspension of the powder particles containing a metal element is irradiated with the femtosecond laser so that the powder particles are divided into nanometer-size wires containing the metal element, and then the nanometer-size wires thus formed are irradiated further with the laser so that the nanometer-size wires are divided into nanometer-size particles containing the metal element.

It can be said, for example, that the nanowires of the present invention are the nanowires formed by the production method of the present invention, as well as that they are nanowires obtained by dividing a powder particle containing a metal element.

In the production method of the present invention, the suspension of the powder particles containing a metal element is irradiated with the femtosecond laser to form nanowires containing the metal element. The suspension to be irradiated with the laser can be prepared, for example, by mixing the powder particles and a medium. That is, the production method of the present invention does not require a vacuum and high temperature environment for forming the nanowires, and does not require the preparations of the precursor and the ion carrier disclosed in Documents 2 and 3 as a starting material, either. Moreover, the nanowires thus formed easily can be taken out by a technique, such as removing the medium, or filtering off the nanowires from the suspension. Accordingly, the production method of the present invention allows to form nanowires containing a metal element more easily than conventional methods.

In the production method of the present invention, nanowires are formed by dividing the powder particle with the femtosecond laser irradiation. That is, the production method of the present invention allows formation of a plurality of nanowires simultaneously, and makes it easier to control the size and shape of the formed nanowires than conventional production methods that are based on deposition of metal or fusion of metallic fine particles.

BEST MODE FOR CARRYING OUT THE INVENTION

Powder Particles

Figure 1:
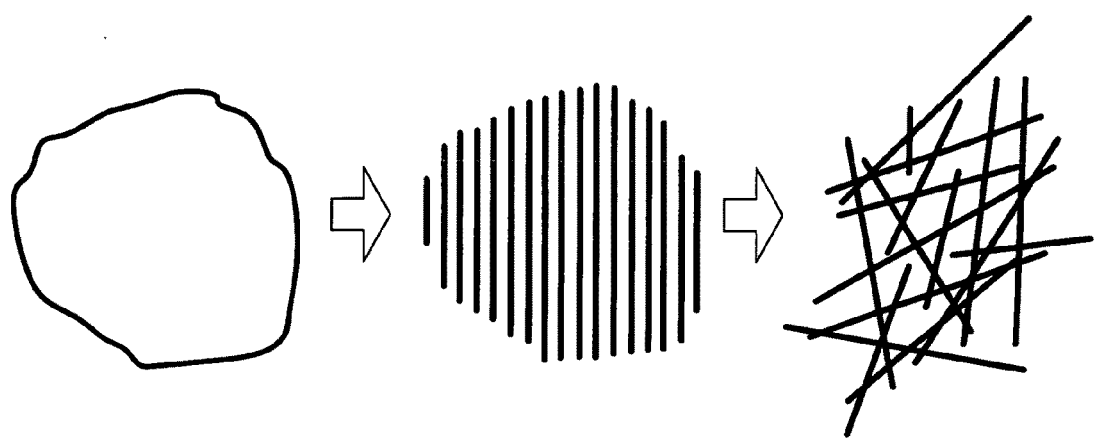
FIG. 1 is a conceptual diagram for illustrating formation of nanowires by dividing a powder particle.
Figure 2:
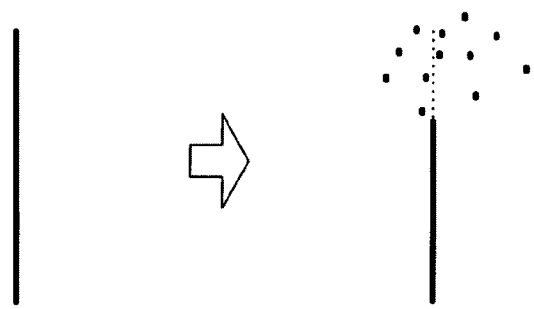
FIG. 2 is a conceptual diagram for illustrating formation of nanoparticles by dividing the nanowire.

A powder particle to be included in a suspension is not limited as long as it contains a metal element. The powder particles are irradiated with a femtosecond laser (hereinafter, also simply referred to as a "laser") to generate the waves of surface plasmon on surfaces of the powder particles.

The type of the metal element contained in the powder particle is not particularly limited, and can be selected suitably according to the application of the nanowires to be formed. In the production methods that need a precursor or a metal ion carrier as a starting material like the methods disclosed in Documents 2 and 3, the type of the metal element constituting the nanowires is limited to an element that can constitute the precursor or the carrier and, at the same time, can be reduced relatively easily (an element with a relatively small standard oxidation reduction potential, such as gold, silver, and palladium). On the other hand, the production method of the present invention does not need such a precursor or a metal ion carrier. Moreover, the production method of the present invention does not require chemical reactions, such as an oxidation-reduction reaction. Thus, it allows to select more freely the type of the metal element constituting the nanowires.

The powder particle may consist of a metal element. In this case, nanowires composed of the metal element can be formed.

One type of metal element, or two or more types of metal elements may be contained in the powder particle. Examples of the powder particle composed of two or more types of metal elements include powder particle made from an alloy, such as solid solution and eutectic body. Nanowires composed of the alloy can be formed from this powder particle.

The metal element contained in the powder particle may be at least one selected from, for example, copper, cobalt, silver, gold, platinum, iron, nickel, tin, zinc, and lead. When the powder particle contains/consists of copper, nanowires containing/consisting of copper can be formed. The nanowires are expected to be used for an application, such as a polarization controlling element and a gas sensor. When the powder particle contains copper and cobalt, for example, when the powder particle consists of a copper-cobalt alloy, nanowires consisting of the copper-cobalt alloy can be formed. The nanowires are expected to be used for, for example, a magnetic material.

The powder particle may contain an element other than metal elements. For example, it may contain oxygen. Examples of the powder particle containing oxygen include a powder particle consisting of an oxide of any of the aforementioned metal elements. Nanowires consisting of the oxide can be formed from this powder particle.

Although the shape of the powder particle is not particularly limited, a non-spherical shape is preferable for easy dividing by laser irradiation. For example, a flaky shape, such as a scale (flake), and a sheet (disk), such as a circular plate, are preferable. In case of flaky powder particles, the surface plasmon can be excited by laser irradiation and interference more easily than in the case of powder particles of other shapes. Thereby, it becomes easier to form the nanowires.

The size of the powder particle is not particularly limited. In the case where the powder particle is flaky and nanowires with a length of 1 μm or more are formed, the powder particle preferably has an average diameter of 1 μm or more. The formation of nanowires by dividing the flaky powder particle becomes easier by setting an average thickness of the powder particle to at least 1 nm but less than 1 μm.

As described above, in the production method of the present invention, it is thought that the powder particle is divided by the excitation of the surface plasmon formed on the surface thereof. An assumed pattern of the excitation is a stripe shape as shown in FIG. 1. Accordingly, in the production method of the present invention, three or more nanowires can be formed from a single powder particle. In other words, the production method of the present invention allows the powder particle to be divided along two or more lines arranged in a stripe shape. With such lines, the powder particle is divided into strip-like pieces to be rod-shaped nanowires.

Figure 18:
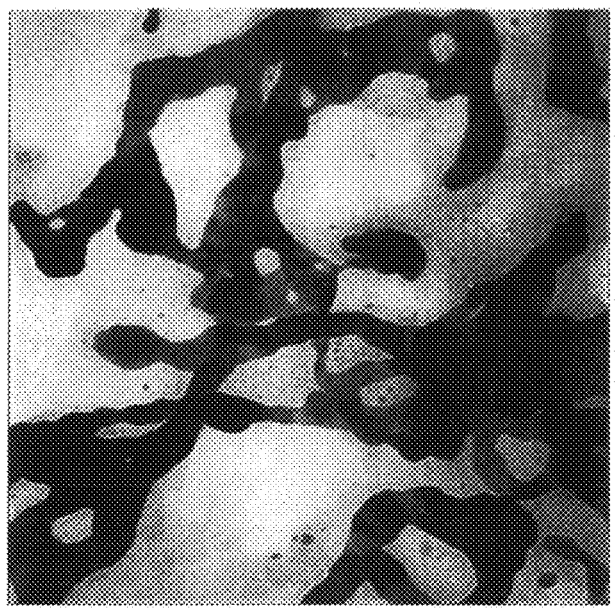
FIG. 18 is a view showing an example of nanowires formed by a conventional method.
Figure 19:
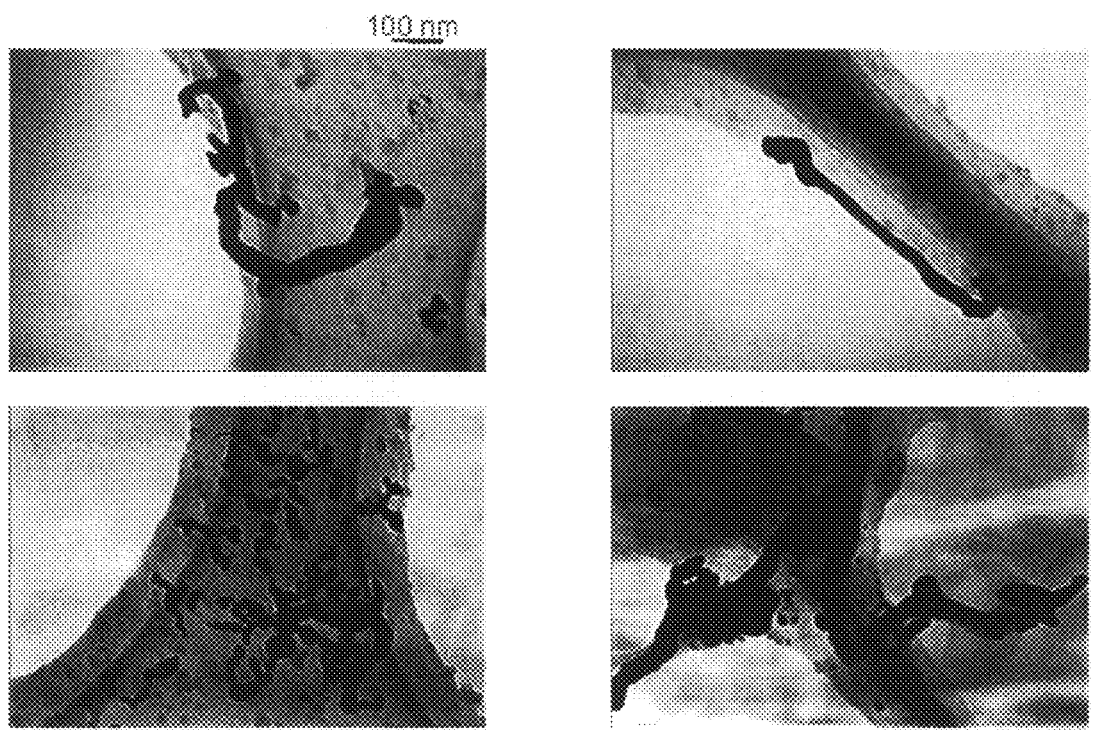
FIG. 19 is a view showing examples of nanowires formed by a conventional method.

In the production method of the present invention, it is possible to form nanowires having the same crystal structure as that of the powder particle because the nanowires are formed by dividing the powder particle. For example, amorphous nanowires are formed when the powder particle is amorphous, and polycrystalline nanowires are formed when the powder particle is polycrystalline. That is, the production method of the present invention makes it possible to form rod-shaped nanowires consisting of polycrystalline structure containing a metal element. Such nanowires cannot be formed by the methods of Documents 1 to 6. The nanowire obtained by the method of Document 1 is a monocrystalline substance deposited on a specific side of a substrate. The nanowires obtained by the methods of Documents 2 to 6 are formed based on an oxidation-reduction reaction of metal ions, or random fusion of colloidal fine particles. Thus, they are not of a rod shape. For example, the shape of the nanowires shown in FIG. 18 (Document 5) is a reticulate shape.

Since the nanowires are formed by dividing the powder particle in the production method of the present invention, use of the production method of the present invention can increase the yield of the nanowires with respect to the amount of the metal element contained in the starting material more greatly than use of other methods in which nanowires are formed by evaporating and depositing copper (the method disclosed in Document 1), and in which nanowires are formed by depositing the metal element contained in a precursor (carrier) (the methods disclosed in Documents 2 and 3).

In the production method of the present invention, it is possible to form nanowires with an average length smaller than an average diameter of the powder particles, and/or nanowires with an average diameter smaller than an average thickness of the powder particles, when the powder particles are flaky. It should be noted, however, that when the laser irradiation is continued even after the nanowires are formed as in Example below, there sometimes occurs a case where the lengths and the diameters of the nanowires are increased temporarily because the nanowires are divided further into nanoparticles and the nanoparticles thus formed adhere to the nanowires (when the laser irradiation is continued further, the dividing of the nanowires proceeds, allowing almost all of the powder particles originally included in the suspension to be divided into nanoparticles.) Accordingly, in order to form nanowires with the average length smaller than the average diameter of the powder particles, or nanowires with the average diameter smaller than the average thickness of the powder particles, it is sometimes necessary to control conditions of the laser irradiation, such as irradiation period, irradiation pulse number, and wavelength.

Focusing attention to the fact that the formed nanoparticles adhere to the nanowires, it also can be said that the production method of the present invention allows formation of nanowires with nanoparticles adhering to a side surface and/or an end face thereof, depending on the conditions of the laser irradiation. Such nanowires cannot be obtained by conventional methods.

(Suspension)

A suspension to be irradiated with the laser is prepared by mixing the powder particles and the medium. While the laser is being irradiated, the suspension preferably is stirred using a stirring device such as a stirrer in order to irradiate the powder particles contained in the suspension with the laser more uniformly.

The medium of the suspension is not particularly limited, and may be selected arbitrarily. The medium is preferably a nonaqueous medium in the case of suppressing oxidation of the nanowires formed in the suspension (in the medium). As the nonaqueous medium, alcohol or acetone may be used, for example. Use of the alcohol or acetone as a medium makes it easier to extract the nanowires formed in the suspension because these media can be evaporated relatively easily.

The nanowires and the below-mentioned nanowire group formed by the production method of the present invention may be circulated while being contained in the medium, if needed.

The alcohol used as the medium may be at least one selected from, for example, methanol, ethanol, propanol, and butanol.

The amount of the powder particles to be contained in the suspension is not particularly limited, and may be set arbitrarily. Preferably, the amount is not excessively large in order to irradiate the powder particles in the suspension with the laser more uniformly. For example, the weight of the powder particles to the total weight of the suspension (that is, the content of the powder particles in the suspension) may be set to approximately 0.001 wt % to 0.1 wt %.

(Femtosecond Laser)

The laser with which the suspension is irradiated is a femtosecond laser with a pulse width of femtosecond ($1^{-13}$ to $10^{-16}$ second), and wavelength, pulse cycle (repetition rate), oscillation source thereof are not particularly limited. The wavelength of the laser, for example, is approximately 200 to 1600 nm usually. The oscillation source of the laser may be a titanium sapphire laser commonly used as a femtosecond laser.

The output of the femtosecond laser is not particularly limited.

The laser is applied while being focused on the suspension and an optical system for that can be set arbitrarily.

(Formation of Nanoparticles)

As described above, the production method of the present invention allows nanoparticles to form by continuing to irradiate the suspension with the laser, that is, by applying the laser for a longer time, or by increasing the pulse number of the laser to be applied. In other words, the production method of the present invention allows nanowires or nanoparticles to form selectively or both to form by controlling the conditions of the laser irradiation.

In the case of forming nanoparticles, it can be said that the production method of the present invention is a method for forming nanoparticles in which the powder particle is divided into nanowires containing the metal element by being irradiated with a laser, and then the nanowires thus formed are divided into nanoparticles by being further irradiated with the laser. It also can be said that the production method of the present invention is a method for obtaining nanoparticles by dividing a powder particle, through production of nanowires.

(Nanowire Group)

In the production method of the present invention, the nanowires are formed by dividing the powder particle. Thus, when a plurality of powder particles is divided, there can be obtained, for example, a nanowire group that includes two or more nanowires, each of which contains the metal element, and also includes the powder particles having the same composition and crystal structure as those of the nanowires, as long as it is before all of the powder particles are divided. Such a nanowire group cannot be obtained by conventional methods.

In the production method of the present invention, it is possible to form a nanowire group including 15 or more nanowires containing the metal element, in which the nanowires are substantially uniform in length and diameter, because the nanowires are formed by dividing the powder particles. Here, "substantially uniform" means that when 15 or more nanowires are arbitrarily selected from a nanowire group, the standard deviation of length of the selected nanowires and the standard deviation of diameter of the selected nanowires are less than predetermined values, respectively. The predetermined values are as follows.

For length: 1 μm when the average length of the selected nanowires is 2 μm to 5 μm, and 2 μm when the average length of the selected nanowires exceeds 5 μm.

For diameter: 20 nm when the average diameter of the selected nanowires is 100 nm or less, and 55 nm when the average diameter of the selected nanowires exceeds 100 nm.

Such a nanowire group cannot be obtained by conventional methods. With regard to a plurality of nanowires to be formed according to Document 1, the inventors estimated average values of length and diameter, and the standard deviations of length and diameter based on the description of Document 1 (paragraph number [0013] and [0014]) and FIG. 1 of the same document). Assuming 15 nanowires were selected, the standard deviation of length was 0.71 μm while the average length was 1.05 μm (that is, the standard deviation of length is 1.35 μm when the average length is 2 μm), and the standard deviation of diameter was 26.0 nm while the average diameter was 75.7 nm (that is, the standard deviation of diameter is 34.3 nm when the average diameter is 100 nm).

EXAMPLE

Hereinafter, the present invention will be described in more detail with reference to Example. The present invention is not limited to the following Example.

(Preparation of Suspension)

Figure 3:
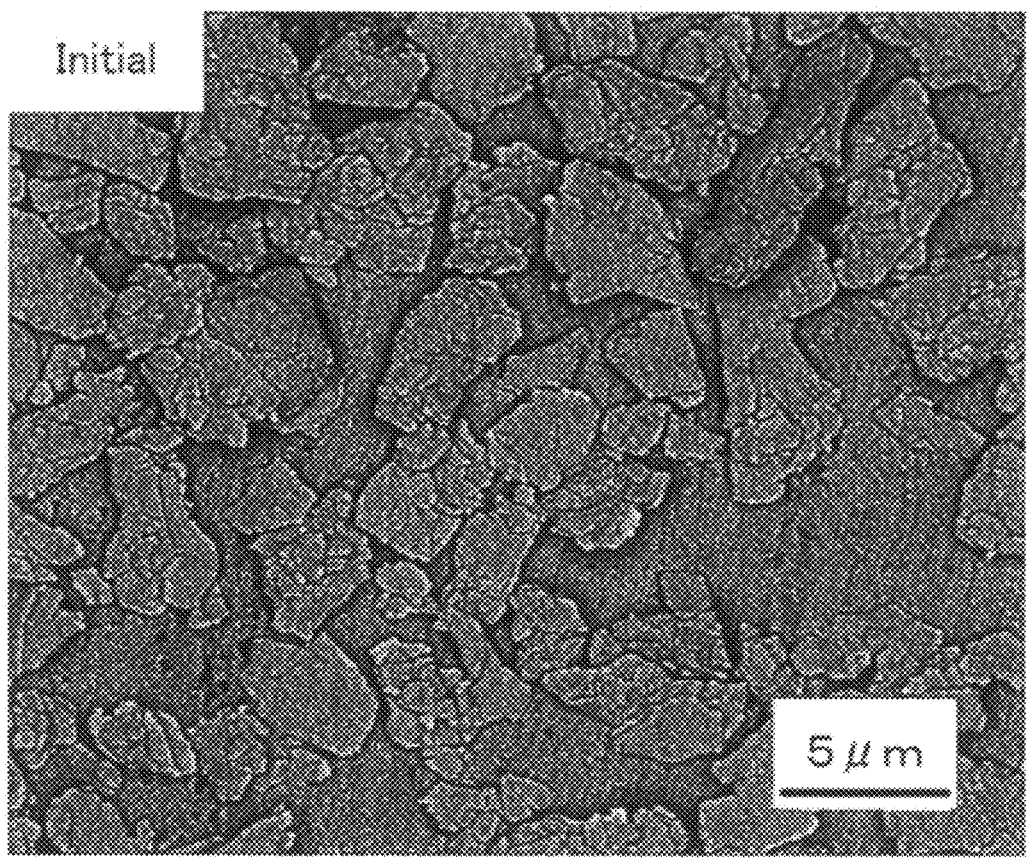
FIG. 3 is a view showing the powder particles (copper flakes) used in Example.

As the powder particles, 4.8 mg of copper flakes (produced by Fukuda Metal Foil & Powder Co. Ltd., average diameter approximately 4 to 5 μm, average thickness approximately 100 nm) was mixed with 6 ml of absolute ethanol, a medium, that had been deoxidized by nitrogen bubbling, and then stirred by a stirrer to obtain a suspension. The content of the copper flakes in the suspension was 0.01 wt %. FIG. 3 shows the copper flakes used for the preparation of the suspension, observed by a scanning electron microscope (SEM).

(Laser Irradiation)

The suspension thus produced was irradiated with a femtosecond laser (a titanium sapphire laser, wavelength 780 nm, pulse width 215 femtoseconds) while being stirred continuously by a stirrer. The color of the suspension changed from copper color to bluish black color with elapse of irradiation time. The repetition rate of the laser was set to 100 Hz or 1 kHz, and the output per unit pulse was set to 400 μJ. The suspension was irradiated with the laser under the condition that an object lens with 0.25 of numerical aperture and 10 times magnification was used for an optical system and the laser was focused on the suspension. The beam width of the laser was approximately 4 μm.

(Evaluation)

Figure 4:
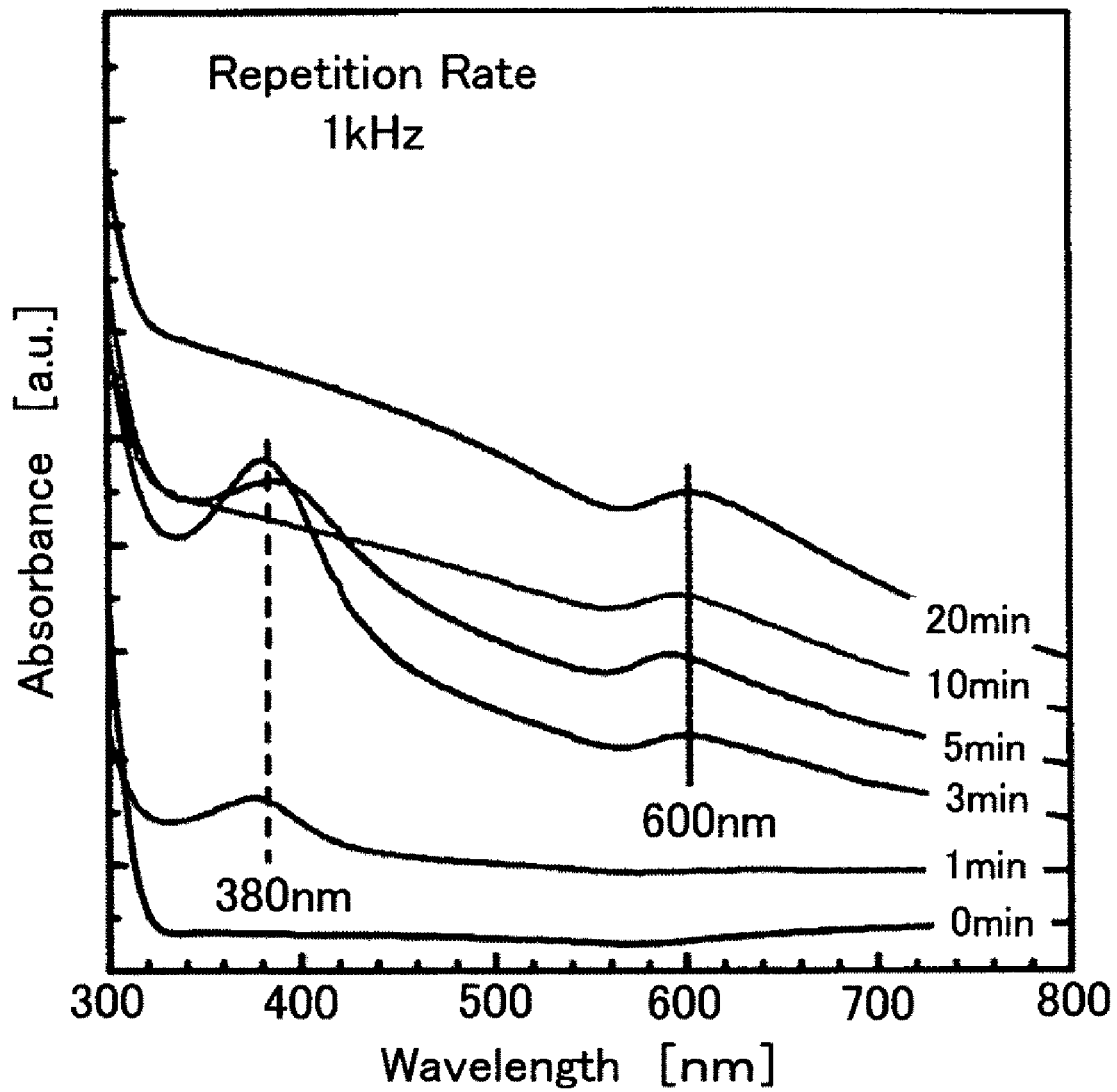
FIG. 4 is a chart showing a variation in absorption spectrum of a suspension for each laser irradiation period (repetition rate 1 kHz), as evaluated in Example.
Figure 5:
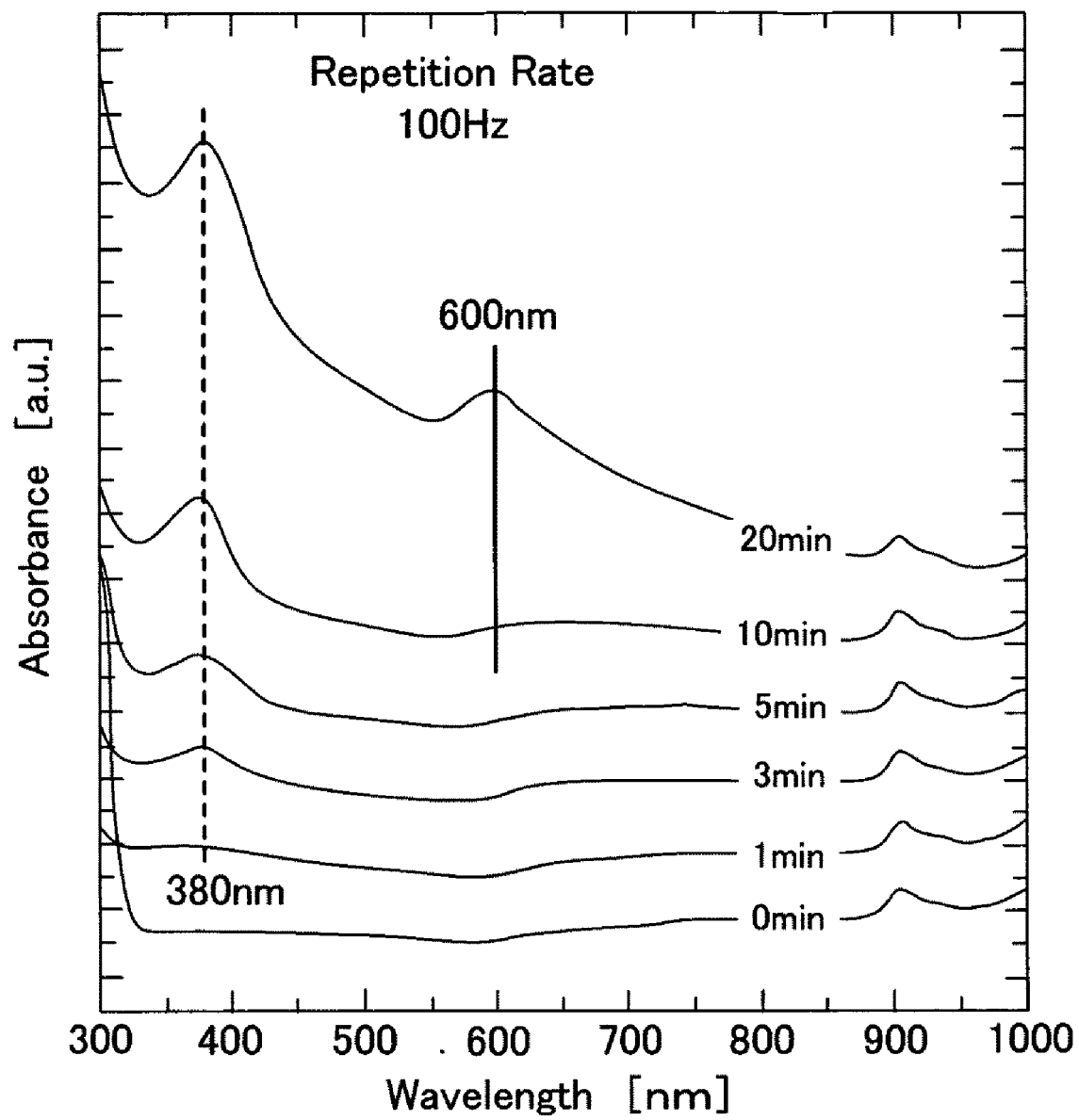
FIG. 5 is a chart showing a variation in absorption spectrum of a suspension for each laser irradiation period (repetition rate 100 Hz), as evaluated in Example.

The suspension was measured for absorption spectrum before being irradiated, as well as after being irradiated for 1 minute, 3 minutes, 5 minutes, 10 minutes, and 20 minutes, respectively, using a spectrophotometer (V-570, manufactured by JASCO Corp.), to evaluate the variation in the absorption spectrum of the suspension for each laser irradiation period. FIG. 4 shows the evaluation results when the repetition rate was 1 kHz. FIG. 5 shows the evaluation results when the repetition rate was 100 Hz.

As shown in FIG. 4, it has been found that, with 1 kHz repetition rate, the laser irradiation causes an absorption peak to appear at around a wavelength of 380 nm, and then causes another absorption peak to appear at around a wavelength of 600 nm with elapse of irradiation time, and that the absorption peak observed at around a wavelength of 380 nm gradually declines and finally disappears.

Figure 6:
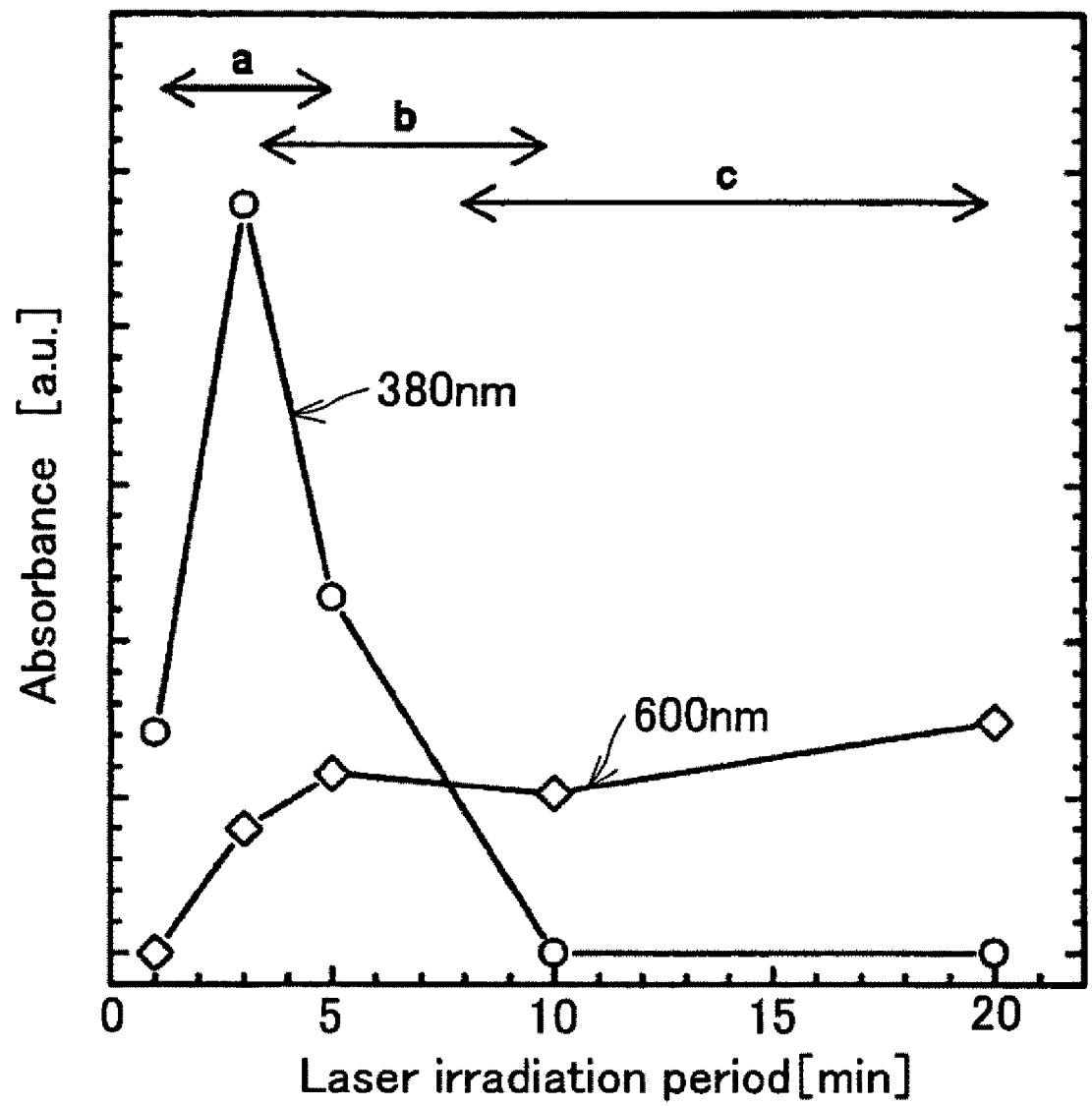
FIG. 6 is a chart showing a variation in peak at around a wavelength of 380 nm and a variation in peak at around a wavelength of 600 nm against the laser irradiation period in case of the absorption spectrum shown in FIG. 4.

FIG. 6 shows the variation in each of the two absorption peaks with elapse of laser irradiation time when the repetition rate was 1 kHz. As shown in FIG. 6, the absorption peak at around a wavelength of 380 nm was maximized 3 minutes after the laser irradiation started, and almost disappeared 10 minutes after the laser irradiation started.

On the other hand, as shown in FIG. 5, when the repetition rate was 100 Hz, an absorption peak appeared at around a wavelength of 380 nm with the laser irradiation, and then another absorption peak appeared at around a wavelength of 600 nm with elapse of irradiation time in the same manner as when the repetition rate was 1 kHz, however, the peak observed at around a wavelength of 380 nm still remained even 20 minutes after the laser irradiation started. The variation in the absorption peak is moderated more greatly at 100 Hz than at 1 kHz. This is conceivably because of the different irradiation pulse numbers for the same laser irradiation period.

According to Mie theory, a surface plasmon absorption of copper nanoparticles with a particle diameter of 10 nm appears at around a wavelength of 560 nm. Moreover, it is known that when the shape of a nanometer-scale substance is changed from a spherical shape (aspect ratio=1) to a shape with a higher aspect ratio, the surface plasmon absorption thereof shifts to a shorter wavelength. From this, it is assumed that the absorption peak at around a wavelength of 380 nm is a peak due to the copper nanowires, while the absorption peak at around a wavelength of 600 nm is a peak due to copper nanoparticles.

Besides the absorption spectrum evaluation, the shape of the substances in the suspension was evaluated after being irradiated with the laser for 1 minute, 3 minutes, 5 minutes, 10 minutes, and 20 minutes, respectively, at a repetition rate of 1 kHz. The evaluation was made by observing, with the SEM, the residue left after the medium was evaporated from the suspension each time. FIG. 7 to FIG. 11 show the results of the SEM evaluation. FIG. 7 to FIG. 11 show the shapes of the substances in the suspension observed after being irradiated with the laser for 1 minute, 3 minutes, 5 minutes, 10 minutes, and 20 minutes, respectively.

Figure 7:
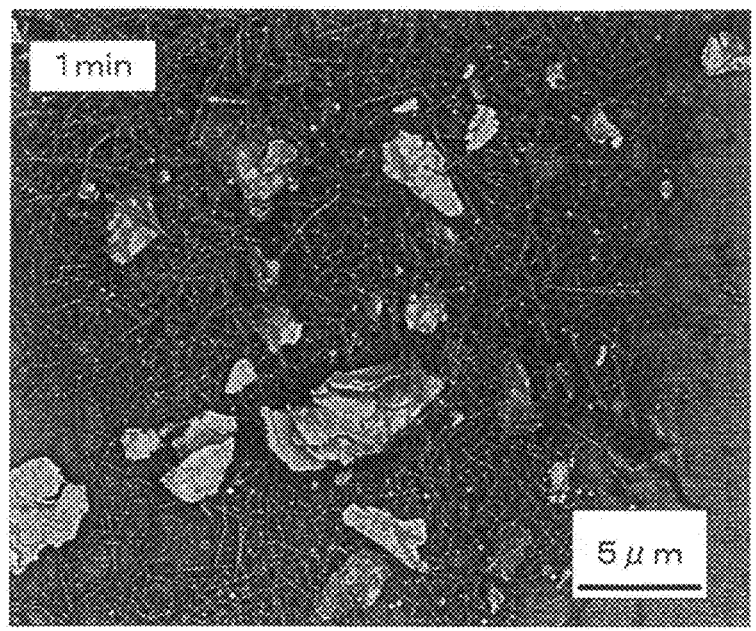
FIG. 7 is a view showing substances in the suspension having been irradiated with the laser (repetition rate 1 kHz) for 1 minute, as evaluated in Example.
Figure 8:
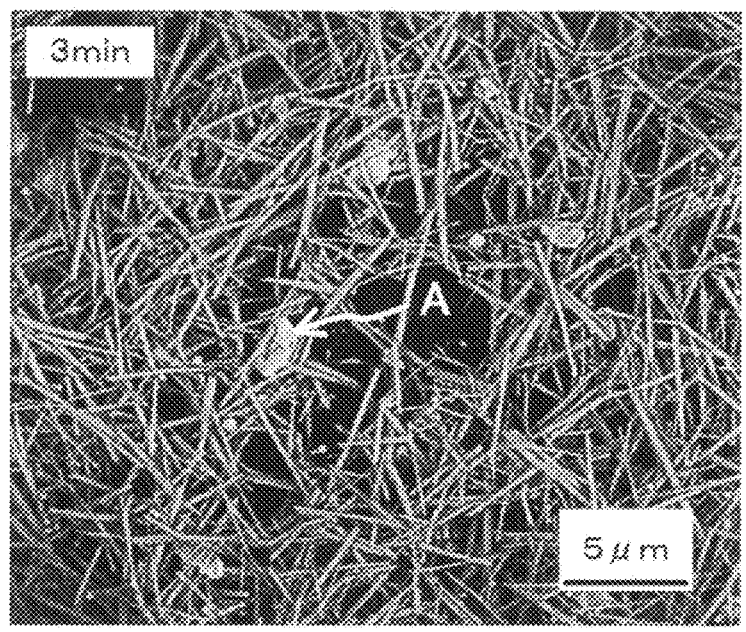
FIG. 8 is a view showing substances in the suspension having been irradiated with the laser (repetition rate 1 kHz) for 3 minute, as evaluated in Example.
Figure 9:
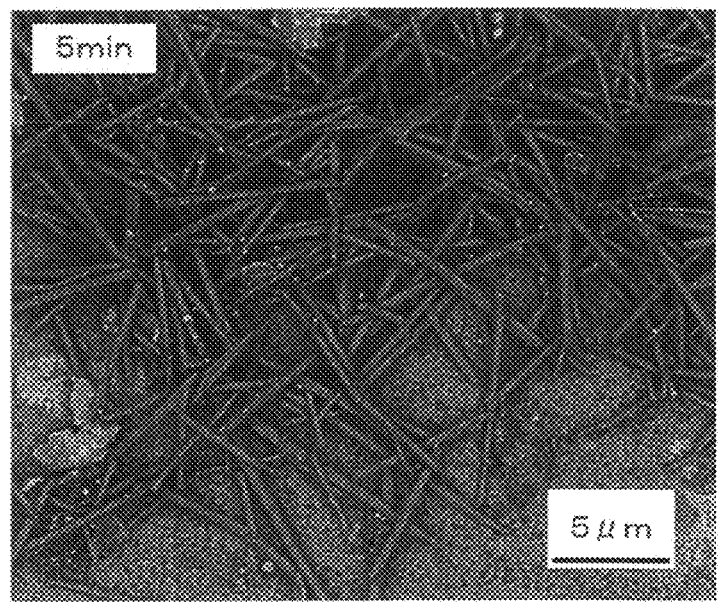
FIG. 9 is a view showing substances in the suspension having been irradiated with the laser (repetition rate 1 kHz) for 5 minutes, as evaluated in Example.
Figure 10:
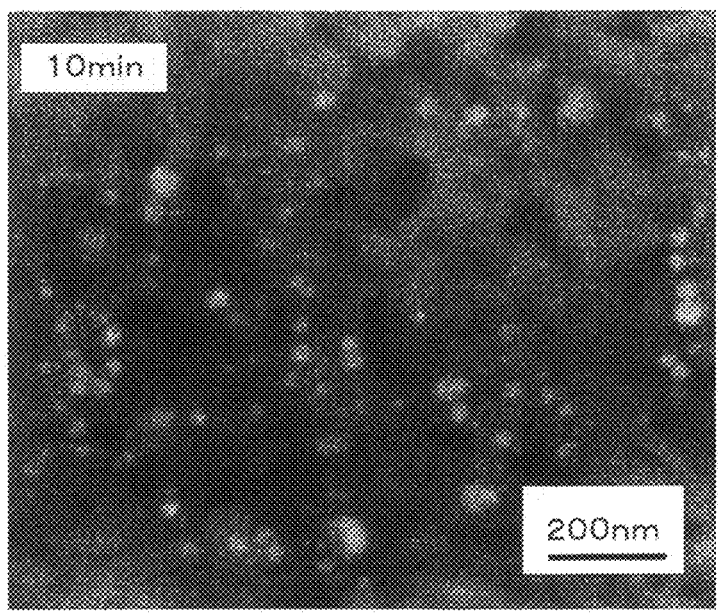
FIG. 10 is a view showing substances in the suspension having been irradiated with the laser (repetition rate 1 kHz) for 10 minutes, as evaluated in Example.
Figure 11:
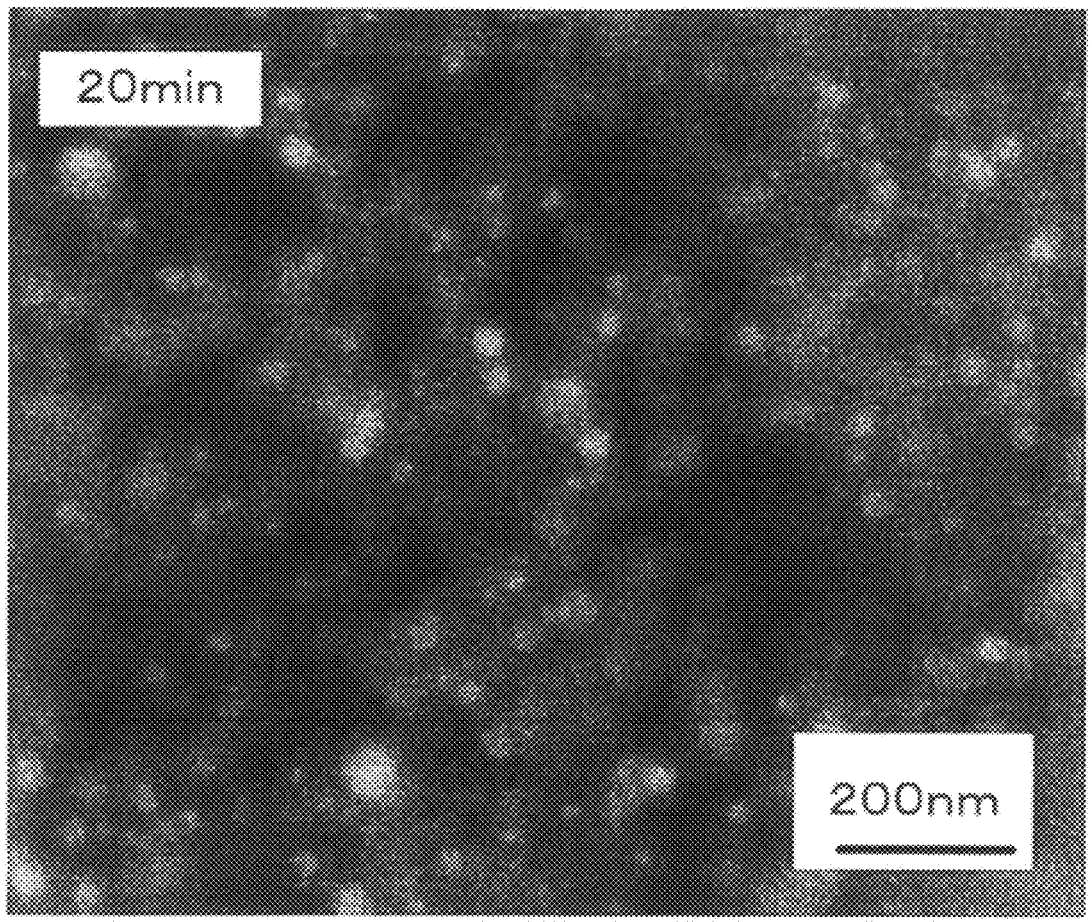
FIG. 11 is a view showing substances in the suspension having been irradiated with the laser (repetition rate 1 kHz) for 20 minutes, as evaluated in Example.

As shown in FIG. 7 to FIG. 11, countless nanowires were formed after 1 minute laser irradiation (FIG. 7). When observed after 3 minute irradiation (FIG. 8), almost all the substances in the suspension were made into nanowires, except a small amount of copper flakes remaining (reference letter A in FIG. 8). When observed after 5 minute irradiation (FIG. 9), the copper flakes mostly disappeared. From a comparison made between FIGS. 7 to 9 and FIG. 3, it is thought that a single powder particle was divided into 3 or more strip-like pieces along two or more lines arranged in a stripe shape, as shown in FIG. 1. As shown in FIGS. 7 to 9, the nanowires were almost uniform in length and diameter at each irradiation period.

When observed after 10 minute irradiation (FIG. 10), nanowires mostly disappeared from the substances in the suspension, and almost all of the substances in the suspension were made into nanoparticles instead. When observed after 20 minute irradiation (FIG. 11), almost nothing changed from the observation after 10 minute irradiation.

Figure 12:
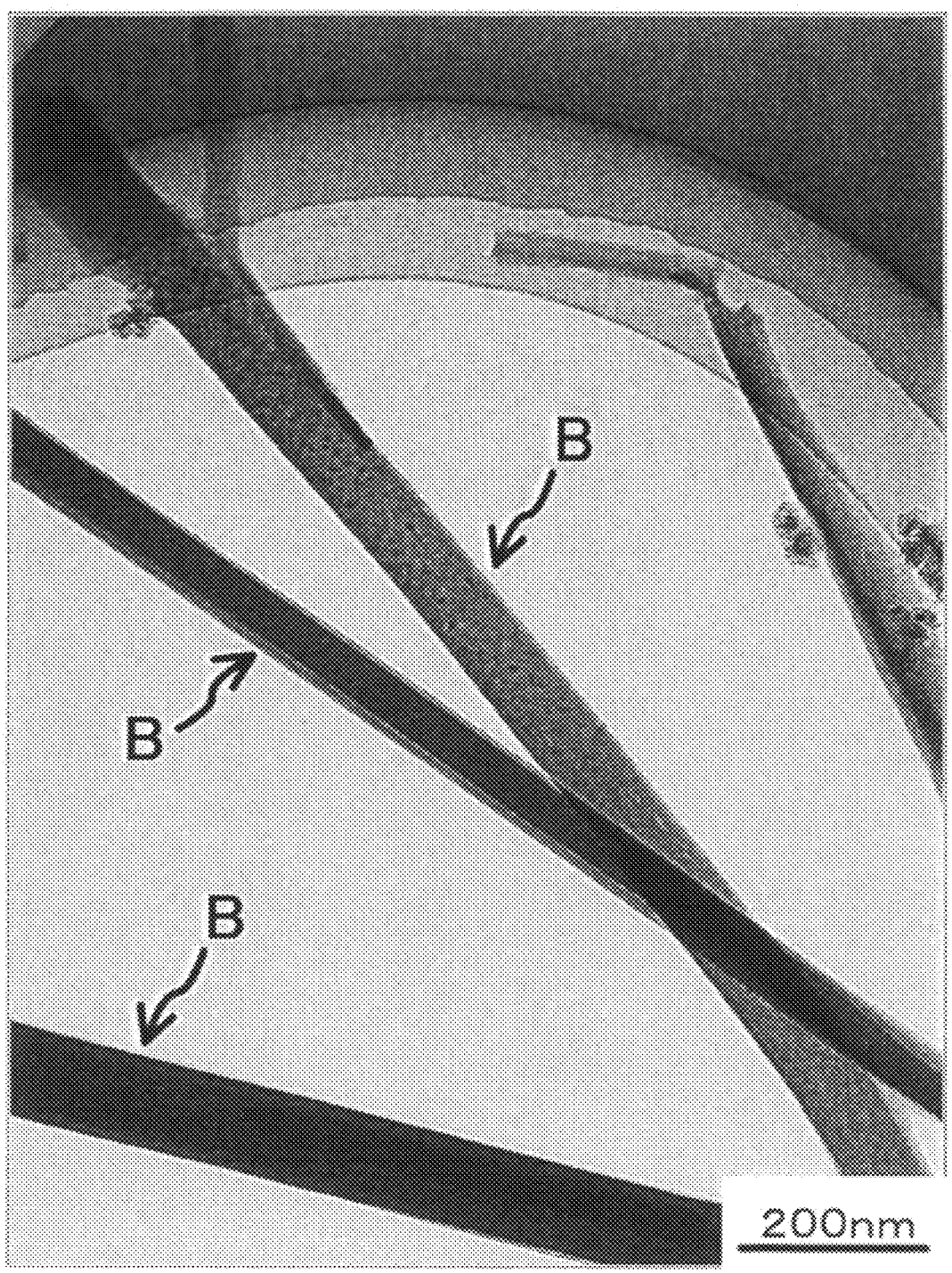
FIG. 12 is a view showing nanowires observed after the 3 minute laser irradiation (repetition rate 1 kHz), as evaluated in Example.
Figure 13:
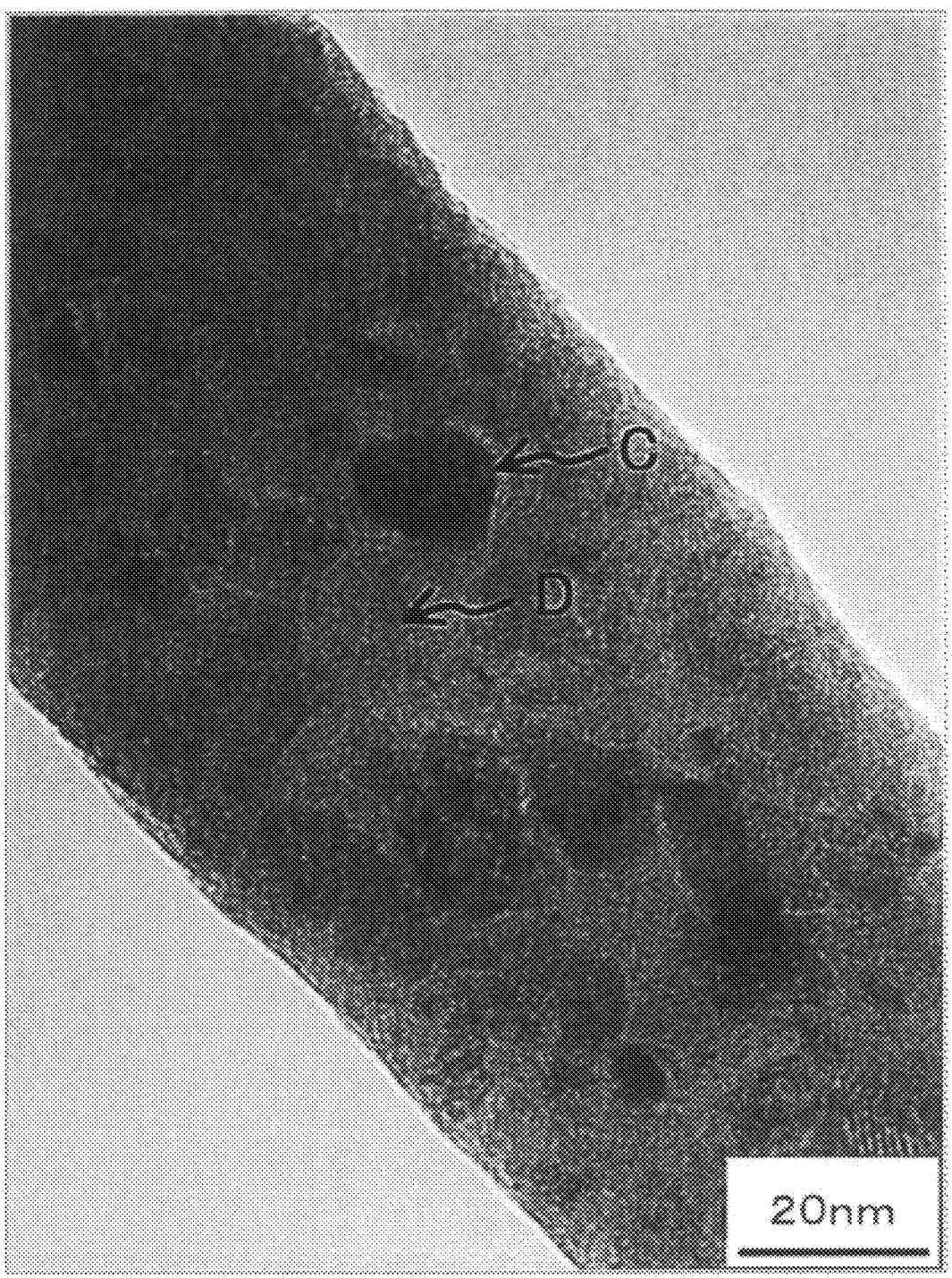
FIG. 13 is a view showing one of the nanowires observed after the 3 minute laser irradiation (repetition rate 1 kHz), as evaluated in Example.
Figure 14A:
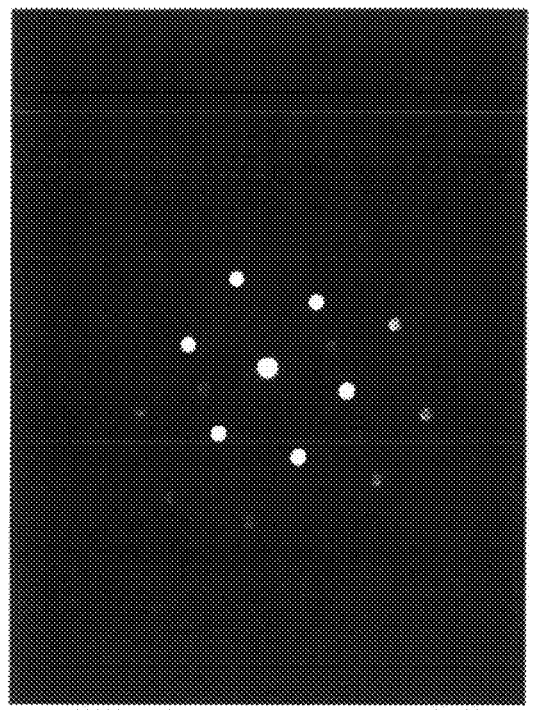
FIG. 14A is a view showing an image of electron beam diffraction at a portion of the nanowire indicated with reference letter C in FIG. 13, observed by a TEM.
Figure 14B:
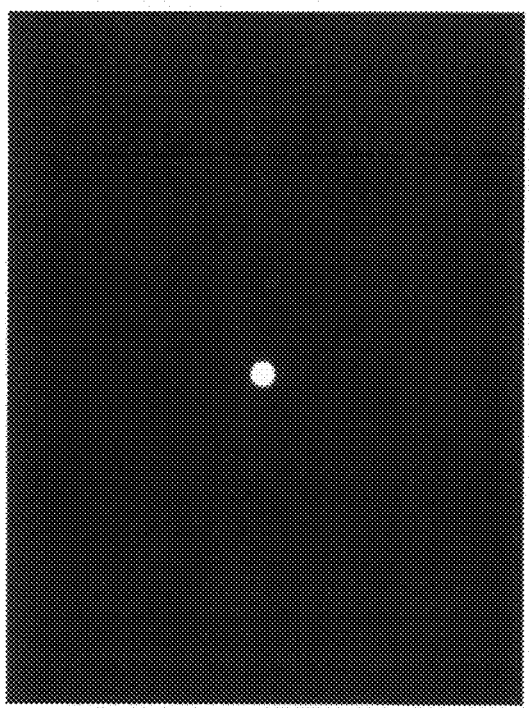
FIG. 14B is a view showing an image of electron beam diffraction at a portion of the nanowire indicated with reference letter D in FIG. 13, observed by the TEM.

Some nanowires were taken out from the residue left after 3 minute laser irradiation and evaluated for their structure through electron beam diffraction by a transmission electron microscope (TEM) and an elemental analysis by an energy dispersive X-ray spectroscopy (EDX). FIGS. 12 and 13 show the TEM observation results of the nanowires. FIGS. 14A and 14B show an image of electron beam diffraction at each portion of the nanowire indicated by reference letters C and D in FIG. 13, respectively.

As shown in FIG. 12 (the substances indicated by reference letter B in FIG. 12 is the nanowires), rod-shaped nanowires with a very smooth surface were formed. Moreover, as shown in FIGS. 13, 14A, and 14B, the nanowires were polycrystalline structures each of which consists of countless crystal grains (grain diameters thereof are in an approximate range of several nanometers to 20 nm, and the average grain diameter is in a range of 5 to 6 nm).

The nanowire was evaluated for its composition at portions indicated by reference letters C and D in FIG. 13 through the elemental analysis by the EDX, and found that each of the portions consists of Cu. This reveals that rod-shaped nanowires, each of which consists of a polycrystalline structure of Cu, were formed by irradiating the suspension with the laser.

Judging from these results, the above-mentioned assumption was found to be essentially correct. For example, the variations in both absorption peaks shown in FIG. 6 agree well with the SEM evaluation results shown in FIG. 7 to FIG. 11. It is thought that in FIG. 6, copper flakes were divided into copper nanowires during a period "a" of the irradiation time represented by the horizontal axis of FIG. 6, the nanowires thus formed during the period "a" were divided into copper nanoparticles during a period "b", and the copper flakes and the copper nanowires were both consumed to complete the formation of the copper nanoparticles during a period "c".

On the other hand, it is thought that when the repetition rate was 100 Hz, the formation of the copper nanowires was still continued 20 minutes after the laser irradiation started because the absorption peak still increased at around a wavelength of 380 nm as shown in FIG. 5.

Figure 15:
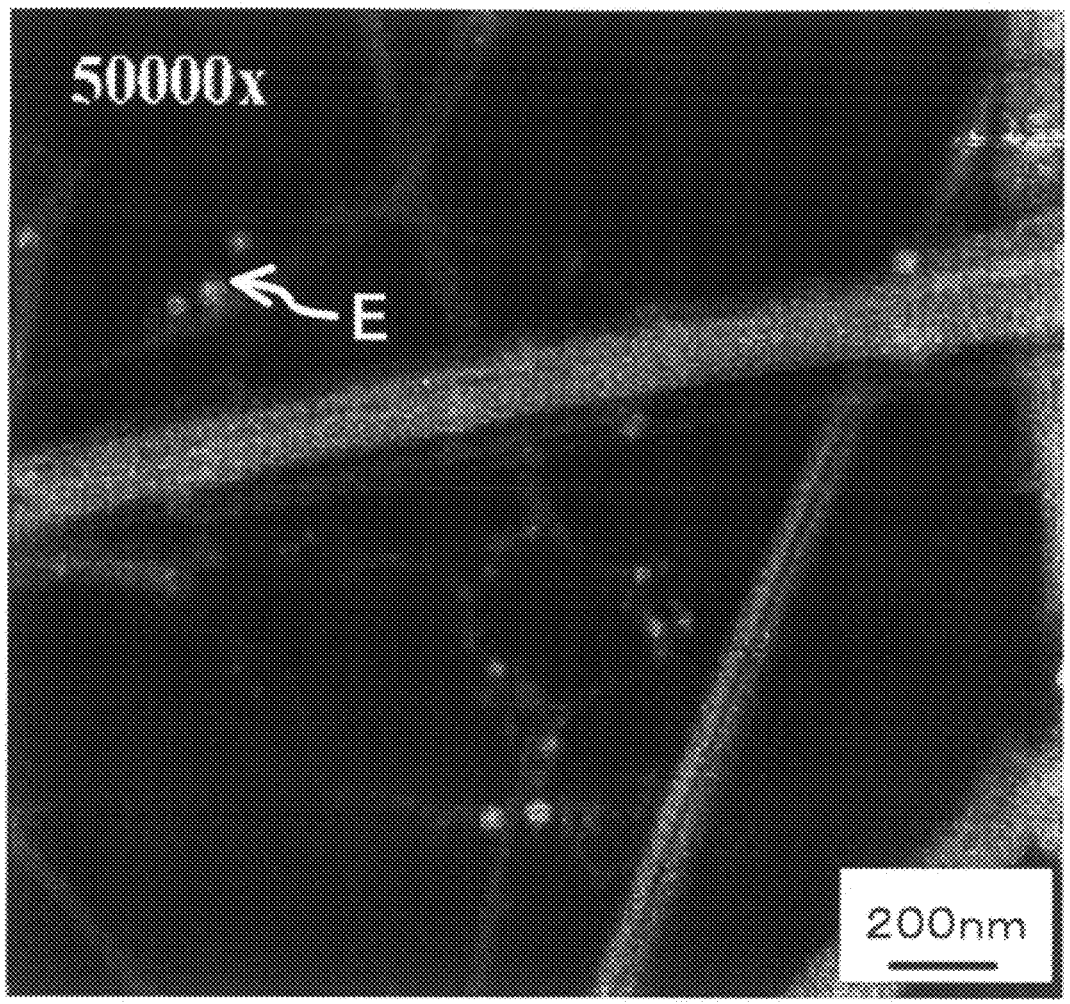
FIG. 15 is a view showing nanowires with nanoparticles adhering to a side surface thereof, as evaluated in Example.

The nanoparticles, which had been formed by dividing the nanowires, adhered to a side surface of a part of the nanowires when observed 5 minutes after the laser irradiation (repetition rate 1 kHz) started (See FIG. 15. Reference letter E in the figure indicates the nanoparticle.)

Besides the evaluations mentioned above, the average length and the average diameter were evaluated with respect to the nanowires observed 1 minute, 3 minutes, and 5 minutes after the irradiation of the laser (repetition rate 1 kHz) started, and with respect to the nanowires observed 3 minute, 5 minutes, 10 minutes, and 20 minutes after the laser irradiation (repetition rate 100 Hz) started, through an analysis of the SEM observation images. The number of nanowires used for the analysis was denoted by n=15, and at the same time, the standard deviation in the average length and the average diameter was calculated, respectively.

Figure 16:
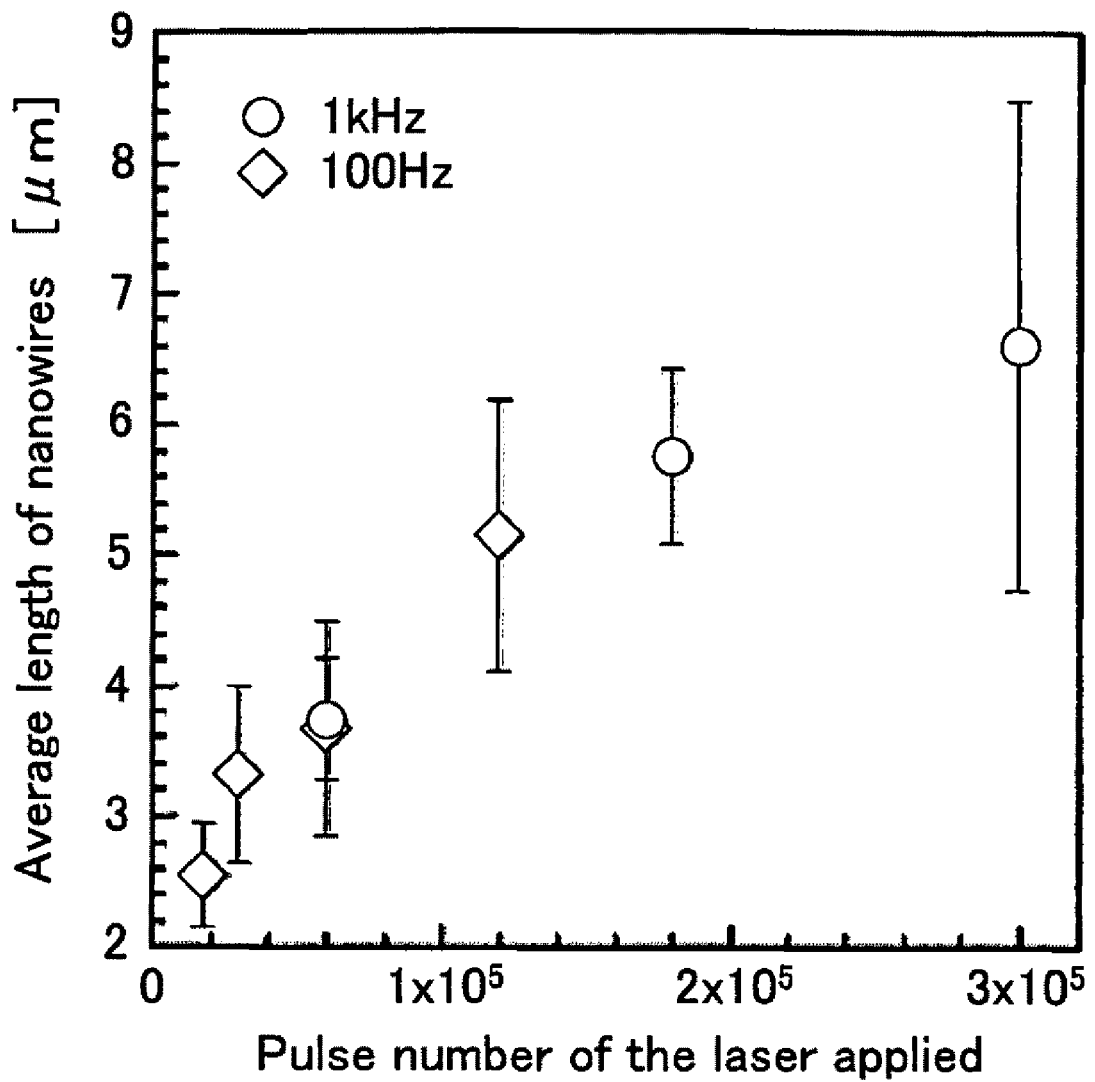
FIG. 16 is a view showing average lengths of the nanowires against the pulse number of the laser applied, as evaluated in Example.
Figure 17:
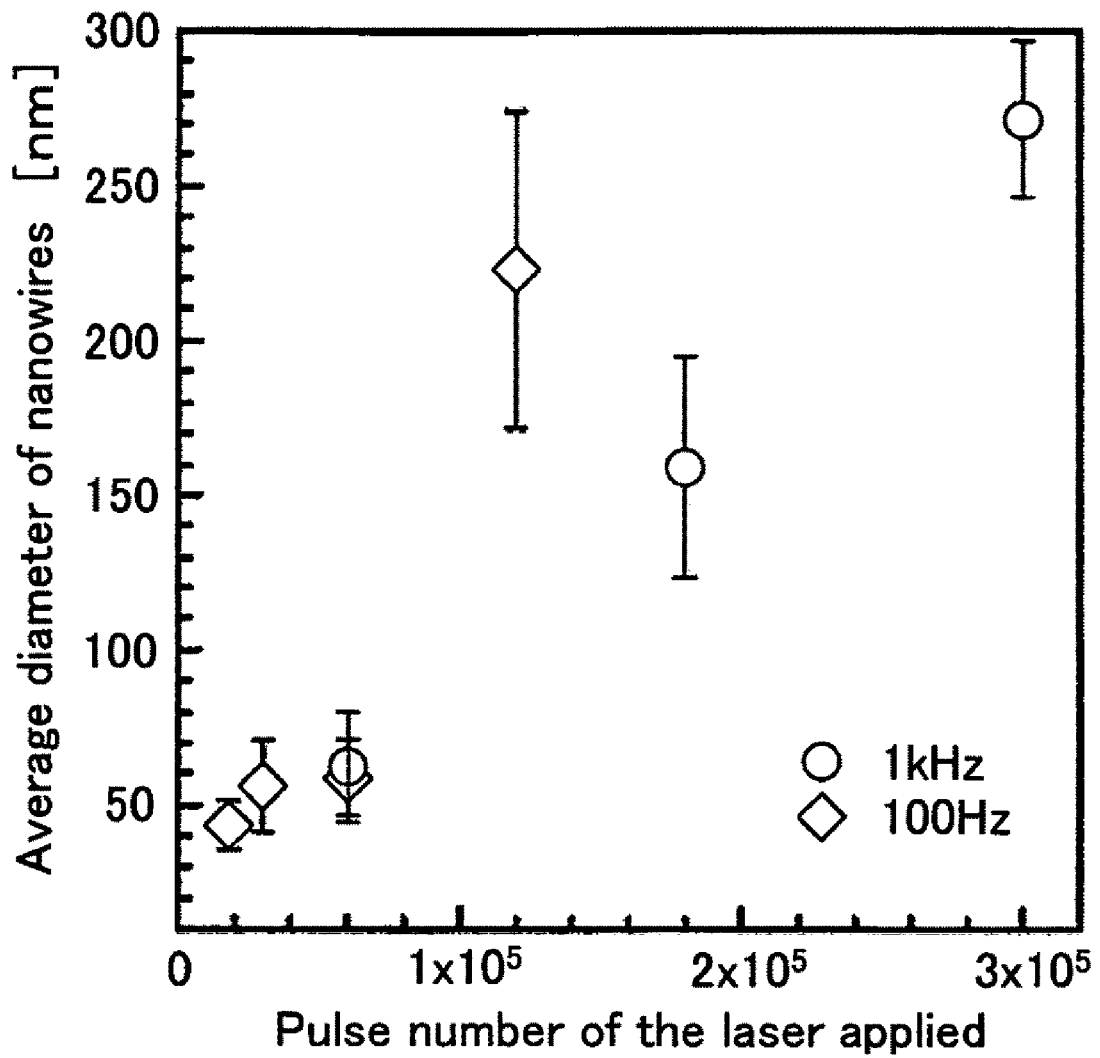
FIG. 17 is a view showing average diameters of the nanowires against the pulse number of the laser applied, as evaluated in Example.

Tables 1 and 2 below and FIGS. 16 and 17 show the evaluation results.

TABLE 1

| Repetition rate [Hz] | Laser irradiation period [minute] | Pulse number of the laser applied | Average length of nanowires [μm] | Standard deviation [μm] |
| --- | --- | --- | --- | --- |
| 1000 | 1 | 60000 | 3.74 | 0.47 |
| | 3 | 180000 | 5.75 | 0.66 |
| | 5 | 300000 | 6.61 | 1.87 |
| 100 | 3 | 18000 | 2.55 | 0.40 |
| | 5 | 30000 | 3.32 | 0.68 |
| | 10 | 60000 | 3.67 | 0.82 |
| | 20 | 120000 | 5.14 | 1.04 |

TABLE 2

| Repetition rate [Hz] | Laser irradiation period [minute] | Pulse number of the laser applied | Average diameter of nanowires [nm] | Standard deviation [nm] |
|---|---|---|---|---|
| 1000 | 1 | 60000 | 62.5 | 17.9 |
| | 3 | 180000 | 158.9 | 36.0 |
| | 5 | 300000 | 271.4 | 25.0 |
| 100 | 3 | 18000 | 43.8 | 7.8 |
| | 5 | 30000 | 56.3 | 14.6 |
| | 10 | 60000 | 58.9 | 12.1 |
| | 20 | 120000 | 223.2 | 51.4 |

As shown in Tables 1 and 2, and FIGS. 16 and 17, it has been found that the average length and the average diameter of the formed nanowires were both increased as the irradiation peiod becomes longer, that is, as the irradiation pulse number was increased. It is assumed that this is because the nanowires further were divided into nanoparticles by being irradiated with the laser, and the nanoparticles thus formed adhered to the nanowires.

It also has been found that when irradiated at the same irradiation pulse number, the nanowires were formed to have almost the same average length and average diameter regardless of the repetition rate.

It has been found that when the irradiation pulse number was less than 60000, the average length and the average diameter of the formed nanowires were equal to or less than the average diameter (approximately 5 μm) and the average thickness (approximately 100 nm) of the copper flakes, which are the starting material, respectively.

A calculation based on the results shown in Tables 1 and 2 reveals that according to the present embodiment, nanowires with an aspect ratio of approximately 20 to, at maximum, 60 can be formed, and the aspect ratio of the formed nanowires decreases as the irradiation period becomes longer.

Focusing attention to the standard deviations shown in Tables 1 and 2, it has been found that when the nanowires have an average length of 2 μm to 5 μm, the standard deviation of length can be 1 μm or less (0.5 μm or less in some cases), and when the selected nanowires have an average length exceeding 5 μm, the standard deviation of length can be 2 μm or less. It also has been found that when the selected nanowires have an average diameter of 100 nm or less, the standard deviation of diameter can be 20 nm or less, and when the selected nanowires have an average diameter exceeding 100 nm, the standard deviation of diameter can be 55 nm or less.

The present invention can be applied to other embodiments that do not depart from its intention and essential features. The embodiments disclosed in this specification are explanatory in all senses and do not limit the present invention. The scope of the present invention is represented not by the above explanation but by accompanying claims, and encompasses all modifications which have a meaning and scope equivalent to the claims.

INDUSTRIAL APPLICABILITY

According to the present invention, it is possible to provide a nanowire production method that is simpler than the conventional nanowire production methods, and that makes it easier to control the size and shape of the nanowires by using a technique completely different from the conventional ones.

The nanowires formed by the production method of the present invention are expected to be applied for various fields. For example, nanowires containing a metal element with excellent electrical conductivity, such as copper, are expected to be applied to wiring or circuits of ultra-small electronic devices, electron emission sources for field emission displays. Nanowires containing an alloy with excellent magnetic properties, such as a copper-cobalt alloy, are expected to be applied to, for example, information recording media. Moreover, in case of copper or platinum, for example, they are expected to be applied to a catalyst with a large surface area in the chemical industry.

The invention claimed is:

1. A method for producing nanometer-size wires, comprising:
dividing a powder particle containing a metal element into nanometer-size wires containing the metal element by irradiating a suspension of the powder particles with a femtosecond laser,
the femtosecond laser being focused on the suspension using an optical system, and the pulse number of the femtosecond laser irradiated on the suspension being 18000 to 300000.

2. The method for producing nanometer-size wires according to claim 1, wherein the metal element is copper.

3. The method for producing nanometer-size wires according to claim 1, wherein the powder particle has a flaky shape.

4. The method for producing nanometer-size wires according to claim 1, wherein the powder particle is divided into three or more of the nanometer-size wires.

5. The method for producing nanometer-size wires according to claim 1, wherein the powder particle is divided along two or more lines arranged in a stripe shape.

6. The method for producing nanometer-size wires according to claim 1, wherein a medium of the suspension is a nonaqueous medium.

7. The method for producing nanometer-size wires according to claim 1, wherein a medium of the suspension is alcohol or acetone.

8. The method for producing nanometer-size wires according to claim 1, wherein the femtosecond laser is a titanium sapphire laser.

9. A method for producing nanometer-size particles, comprising:
dividing the nanometer-size wires obtained by the method according to claim 1 into nanometer-size particles containing the metal element by further irradiating the nanometer-size wires with the femtosecond laser,
wherein the femtosecond laser is focused on the suspension using the optical system.

10. The method for producing nanometer-size wires according to claim 1, wherein the nanometer-size wires have the same crystal structure as the powder particle.

* * * * *